United States Patent [19]
Gillard et al.

[11] Patent Number: 5,450,506
[45] Date of Patent: Sep. 12, 1995

[54] IMAGE DATA PROCESSING APPARATUS AND METHOD

[75] Inventors: Clive H. Gillard, Basingstoke; Terence R. Hurley, Newbury, both of United Kingdom; Yoshihiro Murakami; Mamoru Ueda, both of Tokyo, Japan

[73] Assignee: Sony United Kingdom, Ltd., Staines, United Kingdom

[21] Appl. No.: 29,224

[22] Filed: Mar. 10, 1993

[30] Foreign Application Priority Data

Apr. 7, 1992 [GB] United Kingdom ................. 9207585

[51] Int. Cl.$^6$ ............................................. G06K 9/00
[52] U.S. Cl. ..................................... 382/309; 348/27; 348/405; 358/336; 382/254
[58] Field of Search ................... 382/54, 56, 49, 9, 43, 382/57; 364/413.18, 577; 358/525, 428, 433, 447, 450, 310, 327, 133, 336, 525; 395/87, 114; 348/395, 392, 403, 405, 27; 360/48, 53

[56] References Cited

U.S. PATENT DOCUMENTS

| | | | |
|---|---|---|---|
| 4,633,330 | 12/1986 | Yamamitsu et al. | 358/310 |
| 4,984,286 | 1/1991 | Dolazza | 382/54 |
| 5,130,798 | 7/1992 | Christopher | 358/140 |
| 5,146,326 | 9/1992 | Hasegawa | 358/135 |
| 5,177,797 | 1/1993 | Takenaka et al. | 382/56 |

FOREIGN PATENT DOCUMENTS

| | | | |
|---|---|---|---|
| 0286183 | 10/1988 | European Pat. Off. | H04N 7/133 |
| 0388889 | 9/1990 | European Pat. Off. | H04N 1/415 |

OTHER PUBLICATIONS

Gillard, "Error-Correction Strategy for the New Generation of 4:2:2 Component DVTRs" *SMPTE Journal*, Dec. 1987, pp. 1173-1179.

*Primary Examiner*—Leo H. Boudreau
*Attorney, Agent, or Firm*—William S. Frommer; Alvin Sinderbrand

[57] ABSTRACT

An image data processing apparatus generates output data representing an image in a spatial domain from a plurality of sets of input data, each representing in a spatial frequency domain a sub sampled version of the image in the spatial domain. An error detector detects any erroneous parts of the plurality of sets of input data in the spatial frequency domain. Each of the plurality of sets of input data is transformed from the spatial frequency domain into a sub sampled version of the image in the spatial domain. Any parts of the sub sampled versions that are dependent upon an erroneous part of a set of input data are interpolated from one or more spatially adjacent parts of one or more other sub sampled versions. The sub sampled versions are combined to form the output data.

14 Claims, 5 Drawing Sheets

IMAGE DATA PROCESSING APPARATUS AND METHOD

BACKGROUND OF THE INVENTION

1. Field of the Invention

This invention relates to image data processing. More particularly, this invention relates to error concealment within the field of image data processing.

2. Description of the Prior Art

Known digital video tape recording systems include apparatus and methods for performing error concealment as an integral part of the overall operation. Given the high information densities and stringent requirements with which these systems must cope, errors frequently occur in the reading of the data from the media on which it is stored.

As a first level of protection against such errors, error correction codes are included within the data structure. If the error is a minor one then it is often possible to uniquely identify the particular piece or pieces of information that are in error and what data they should be replaced with. If the error is too severe, then such error correction cannot cope and then reliance is made upon error concealment techniques to reduce the perceivable effect of the error.

In order to facilitate error concealment, the image data is sub sampled into a number of different data processing and recording channels. In this way, if an error occurs in one channel, then there will be data from the remaining channels surrounding the missing data points from the defective channel. For each erroneous pixel, a replacement pixel value can be interpolated from the surrounding pixel values from the other channels. Whilst detail is still lost from the image by such errors, the overall of such error concealment effect is to make the error less immediately perceivable.

In view of the high information densities involved in image data processing, particularly as image definition increases, it is desirable that some form of data compression be performed upon the image data before it is recorded. One set of techniques for achieving such data compression involve the transformation of the image data from the spatial domain into the spatial frequency domain. Once transformed into the spatial frequency domain, the redundancy within the image data can be better exploited to yield efficient compression. The data is stored or transmitted as an encoded version of the image in the spatial frequency domain.

One approach to error concealment within the spatial frequency domain is to adopt an analogous approach to that described above, i.e. data is to sub sampled it into a number of channels then any erroneous parts in the reproduced spatial frequency domain data are interpolated from the immediately adjacent parts of the spatial frequency domain data.

It has been found that the performance of such an error concealment strategy can be poor. In particular, if the image data is transformed into the spatial frequency domain using discrete cosine transformation techniques operating on fixed size blocks of pixels, then an error in a cosine coefficient in the spatial frequency domain will have an effect upon all of the pixels within the corresponding block of pixels in the spatial domain. Since the interpolation in any domain only produces an approximate replacement, the missing cosine coefficient will be likely to be replaced by a value slightly different from the original. The effect once the interpolated replacement has been transformed to the spatial domain is to make the edges of the blocks of pixels used by the transformation technique become visible due to the introduction of discontinuities in the image values between adjacent blocks. The appearance of such regular geometric features within an image is particularly noticeable.

It is an object of the invention to provide improved error concealment within systems processing image data and utilizing domain transformation between the spatial and spatial frequency domains.

SUMMARY OF THE INVENTION

Viewed from one aspect this invention provides an image data processing apparatus for generating output data representing an image in a spatial domain from a plurality of sets of input data each representing in a spatial frequency domain a sub sampled version of said image in said spatial domain, said image data processing apparatus comprising:

(i) an error detector for detecting any erroneous parts of said plurality of sets of input data;

(ii) domain transformation means for transforming each of said plurality of sets of input data from said spatial frequency domain into a sub sampled version of said image in said spatial domain;

(iii) error concealment means for interpolating in said spatial domain any parts of said sub sampled versions that ape dependent upon an erroneous part of a set of input data from one of more spatially adjacent parts of one of more other sub sampled versions; and (iv) combining means for combining said sub sampled versions to form said output data.

The error concealment strategy of the invention is to sub sample the image data in the spatial domain prior to transformation into the spatial frequency domain. When this data is to be recovered, errors detected in the spatial frequency domain may be marked and carried forward through the transformation into the spatial domain. However, since the image data was sub sampled in the spatial domain, an error within one set of spatial frequency domain information will have an effect upon a sub sampled set of pixels within the spatial domain. These sub sampled erroneous pixels ape highly likely to be surrounded by true pixels values derived from another of the sets of data and so an effective interpolation may be made. Whilst on a theoretical level, the same amount of information may have been lost from the image data, the invention makes this loss less noticeable.

It will be appreciated that the image may be sub sampled in the spatial domain in a variety of different ways e.g. horizontally, vertically, quincunx, etc. However, in preferred embodiments of the invention when the image is a horizontally raster scanned image then the sub sampled versions are horizontally sub sampled.

This preferred feature recognizes and exploits the fact that image resolution in the raster scan direction is usually much greater than in the direction perpendicular to the raster scan. This is particularly true when the image data is interlaced. By sub sampling in the direction of maximum resolution, information is present in the other sets of data from spatially close parts of the image and so an accurate interpolation may be made.

Particularly preferred embodiments exploiting this are ones in which said image is represented by a first horizontally sub sampled version and a second horizontally sub sampled version, and said error concealment means interpolates any parts of said first horizontally sub sampled version from horizontally adjacent parts of said second horizontally sub sampled version.

It will be appreciated that the above technique is applicable to single channel systems in which the different sets of input data are time division multiplexed, but in preferred embodiments said plurality of sets of input data are processed by a plurality of different data processing channels. A multichannel system is better suited to coping with the high information densities associated with image data.

A multichannel architecture may be exploited to provide additional advantages if said image is a moving image and said plurality of sets of input data switch data processing channels between temporally adjacent images. By switching the data channel through which each particular set of input data is passed between temporally adjacent images, temporal interpolation to assist concealment of errors may also be provided.

It will be appreciated that the transformation between the spatial domain and the spatial frequency domain could be effected by a number of different transformation techniques such as discrete cosine transformation or sub band transformation. However, this invention is particularly useful when said plurality of sets of input data is formed by performing discrete cosine transformation upon blocks of image data within said sub sampled version represented by that set of input data.

As discussed above, the error concealment strategy of the invention requires that the errors are passed from the spatial frequency domain into the spatial domain. In order that the parts of the image that need to be interpolated in the spatial domain can be correctly and simply identified, preferred embodiments of the invention comprise:

a spatial frequency domain error flag memory for storing spatial frequency domain error flags indicating those parts of said plurality of sets of input that are erroneous;

a spatial domain error flag memory for storing spatial domain error flags indicating those parts of said sub sampled versions that are dependent upon an erroneous part of said plurality of sets of input; and error flag mapping means for mapping spatial frequency domain error flags to spatial domain error flags.

A complementary aspect of this invention is that of providing data in an appropriate form from which the error concealment strategy discussed above may be carried out. To this end, the invention also provides an image data processing apparatus for generating a plurality of sets of output data each representing in a spatial frequency domain a sub sampled version of an image in said spatial domain from input data representing said image in a spatial domain, said image data processing apparatus comprising:

(i) a splitting means for splitting said input data into a plurality of sub sampled versions of said image; and (ii) domain transformation means for transforming each of said plurality of sub sampled versions from said spatial domain into said spatial frequency domain.

It will be appreciated that error concealment may be used in a variety of situations, e.g. point to point transmission systems. However, the invention is particularly applicable to image data recording and reproducing apparatus.

The invention also provides an image data processing method for generating output data representing an image in a spatial domain from a plurality of sets of input data each representing in a spatial frequency domain a sub sampled version of said image in said spatial domain, said image data processing method comprising the steps of:

(i) detecting any erroneous parts of said plurality of sets of input data;

(ii) transforming each of said plurality of sets of input data from said spatial frequency domain into a sub sampled version of said image in said spatial domain;

(iii) interpolating in said spatial domain any parts of said sub sampled versions that are dependent upon an erroneous part of a set of input data from one or more spatially adjacent parts of one or more other sub sampled versions; and (iv) combining said sub sampled versions to form said output data.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
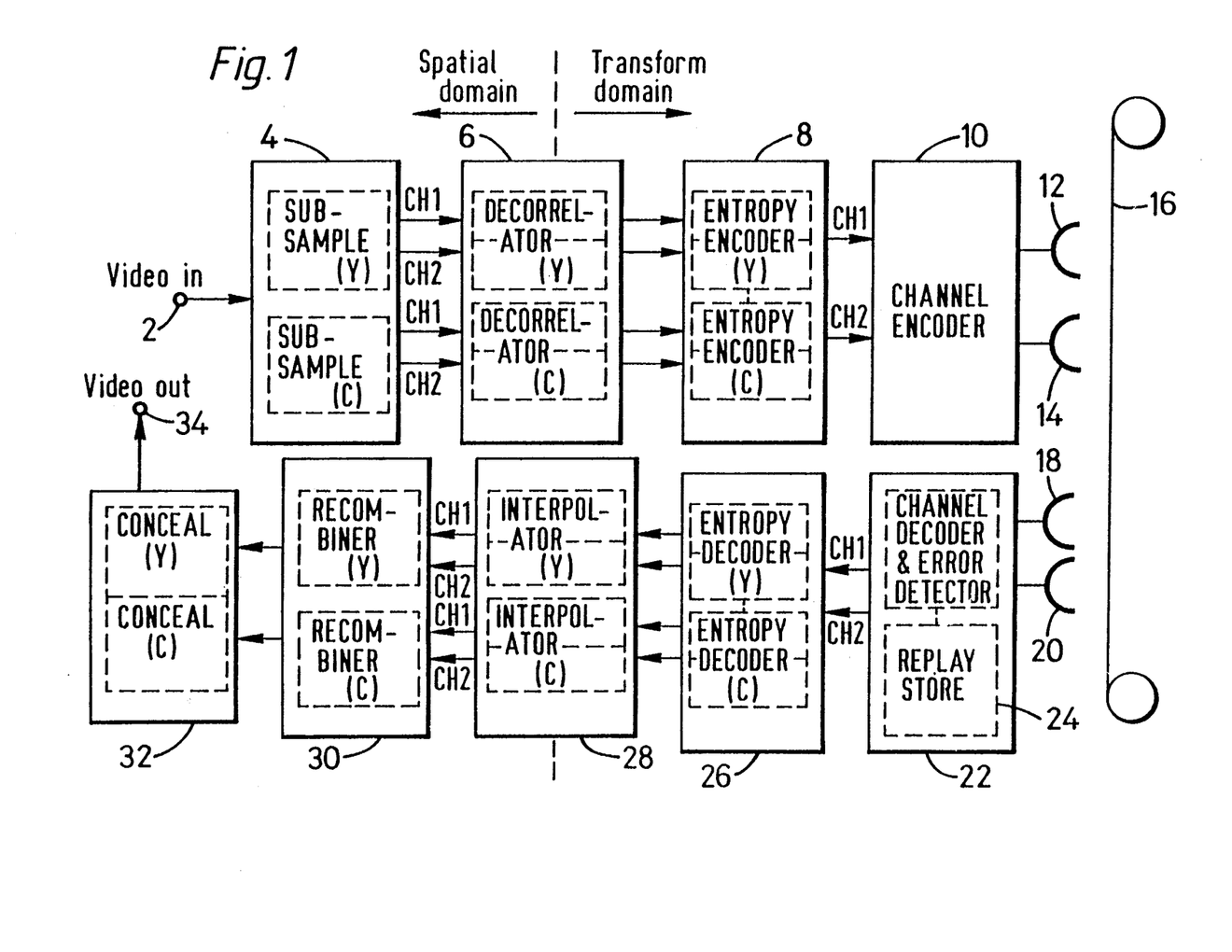
FIG. 1 schematically illustrates in block diagram form a recording and reproducing apparatus according to one embodiment of this invention.

Referring to FIG. 1, input image data representing a horizontally raster scanned image in the spatial domain is input at node 2 to a sub sampling circuit 4. In the sub sampling circuit 4 the luminance (Y) and chrominance (C) components are first separated and then each component is sub sampled into two channels CH1, CH2. The sub sampling circuit 4 effects horizontal sub sampling whereby each channel contains every other pixel value from its respective component.

The sub sampling circuit 4 switches the channel through which each sub sampled versions of the image is fed between temporally adjacent frames of the image. In this way if one channel is seriously defective, then image data from one area of the image in the spatial domain is not permanently blocked and a degree of temporal averaging is achieved. In more sophisticated embodiments a specific temporal concealment strategy may be provided as a back up to spatial concealment, this being greatly facilitated by the switching of channels.

The four channels (sets of data) output from the sub sampling circuit 4 are fed to a decorrelator 6. The decorrelator 6 performs discrete cosine transformation (DCT) separately upon each of the sets of data fed to it. This transforms the data from the spatial domain into the spatial frequency domain.

The output from the decorrelator is fed to an entropy encoder 8 where it is subject to entropy encoding (e.g. Huffman coding) to effect compression thereof. In this particular embodiment, the entropy encoder multiplexes the sub sampled channels CH1, CH2 to produce a single stream of data for each component of the input image data. This is then passed via a channel encoder 10 to recording heads 12, 14 where it is recorded onto a magnetic tape 16.

The combined action of the various circuits in the recording path has the effect that each data block laid down on the magnetic tape 16 contains a transformed, encoded and compressed version of a set of horizontally sub sampled data from the original input image data. If errors in reproducing the data (e.g. drop outs) occur, then these are most likely to effect only individual data blocks with a resultant loss of only one sub sampled part of the original input image data from a particular region of the image in the spatial domain. In this way, the other sub sampled part of the input image data can be used to provide effective error concealment.

The data recorded on the magnetic tape is replayed with replay heads 18, 20 connected to a channel decoder circuit 22. The channel decoder circuit rearranges the data from the sequence of blocks in which it was recorded into a sequence of blocks that can be more readily processed by the subsequent circuitry using a replay store 24. The channel decoder circuit 22 also performs the function of checking and error detection and correction using error correction codes associated with each block of recorded data. In the standard manner, these error correction codes provide an indication of whether a particular block of data has been corrupted and give a first line of defense that can correct minor errors within blocks.

The channel decoder circuit 22 also performs the function of marking blocks of data in which errors have been detected that could not be corrected using the standard error correction techniques. It is these erroneous blocks of data that require error concealment to be performed thereon. The output from the channel decoder circuit 22 is two streams of data for each of the components of the input image data.

These two channels are fed to an entropy decoder 26 where they are decoded to effect decompression and splitting into two sub sampled channels. At this point the data is still in the spatial frequency domain.

The output from the entropy decoder 26 is fed to an interpolator 28 which carries out inverse discrete cosine transformation (IDCT) upon the data to transform it back into the spatial domain. Blocks of data that were previously marked as erroneous are substituted with zero values as they pass through the interpolator and the corresponding parts of the data in the spatial domain are marked as erroneous.

The output from the interpolator 28 is fed to a recombining circuit 30 where the sub sampled channels are combined to form the full resolution versions of their respective components. The pixels within the recombined data that have been produced from erroneous data recovered from the magnetic tape 16 are marked as such.

The recombining circuit 30 can be arranged to take account of any temporal switching of channels that may be performed by the sub sampling circuit 4. This is necessary to ensure the correct pixels are drawn back in their original positions rather than displaced to the positions of the pixels in the other sub sampled version of the image.

The output from the recombining circuit 30 is fed to a concealment unit 32 which carries out error concealment upon the marked pixels based upon horizontally adjacent pixels which will be from a different sub sampled channel. The concealed video output is supplied to an output node 34.

Figure 2:
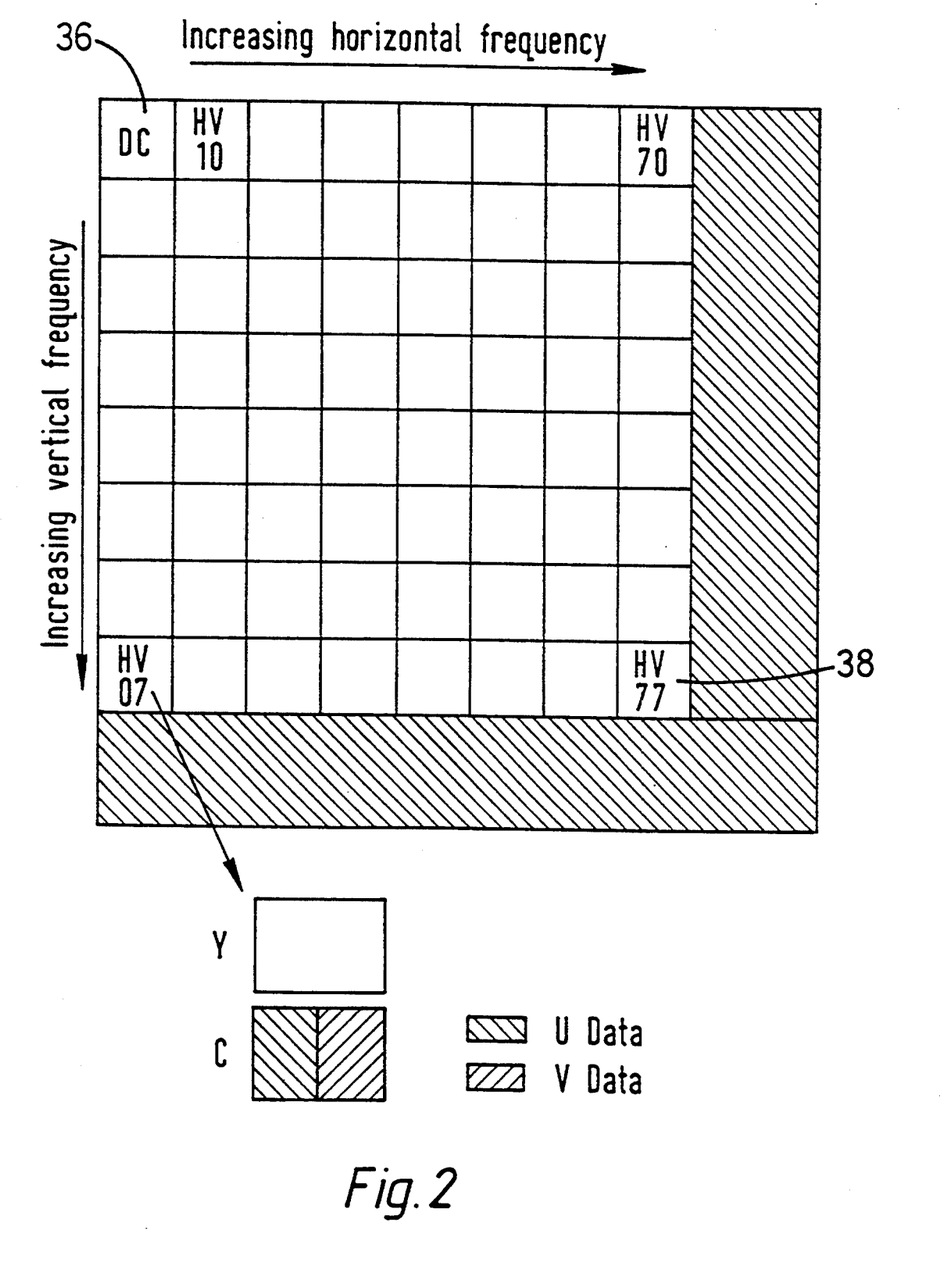
FIG. 2 illustrates the data format in the spatial frequency domain.

FIG. 2 illustrates the image data format in the spatial frequency domain. Discrete cosine transformation is performed on fixed size blocks of input pixels to produce a collection of cosine coefficients for that block of input pixels. Each coefficient represents a particular two dimensional spatial frequency component for that block of pixels. The cosine coefficients for particular two dimensional spatial frequencies are collected together into sub pictures. Thus sub picture 36 represents the dc components of each of the pixel blocks within the input image and has the appearance of a low resolution version of the original input image. In contrast, sub picture 38 represents the highest frequency components from each of the blocks of pixels that have been transformed. In practice, most of the information in the signal is concentrated in the lower frequency sub picture and the high frequency sub picture generally contain long runs of zero values that can be efficiently compressed. When converted to a signal for transmission between processing elements, the sub pictures are surrounded by blanking periods so that they can be processed by adapted versions of standard television signal processing equipment.

The sub pictures of data shown in FIG. 2 represent one of the component channels of the original input image data. Thus, each sub picture in the luminance channel will consist of luminance data Y whereas each sub picture in the chrominance channel will consist of chrominance data C composed of two colour difference signals U,V.

Figure 3:
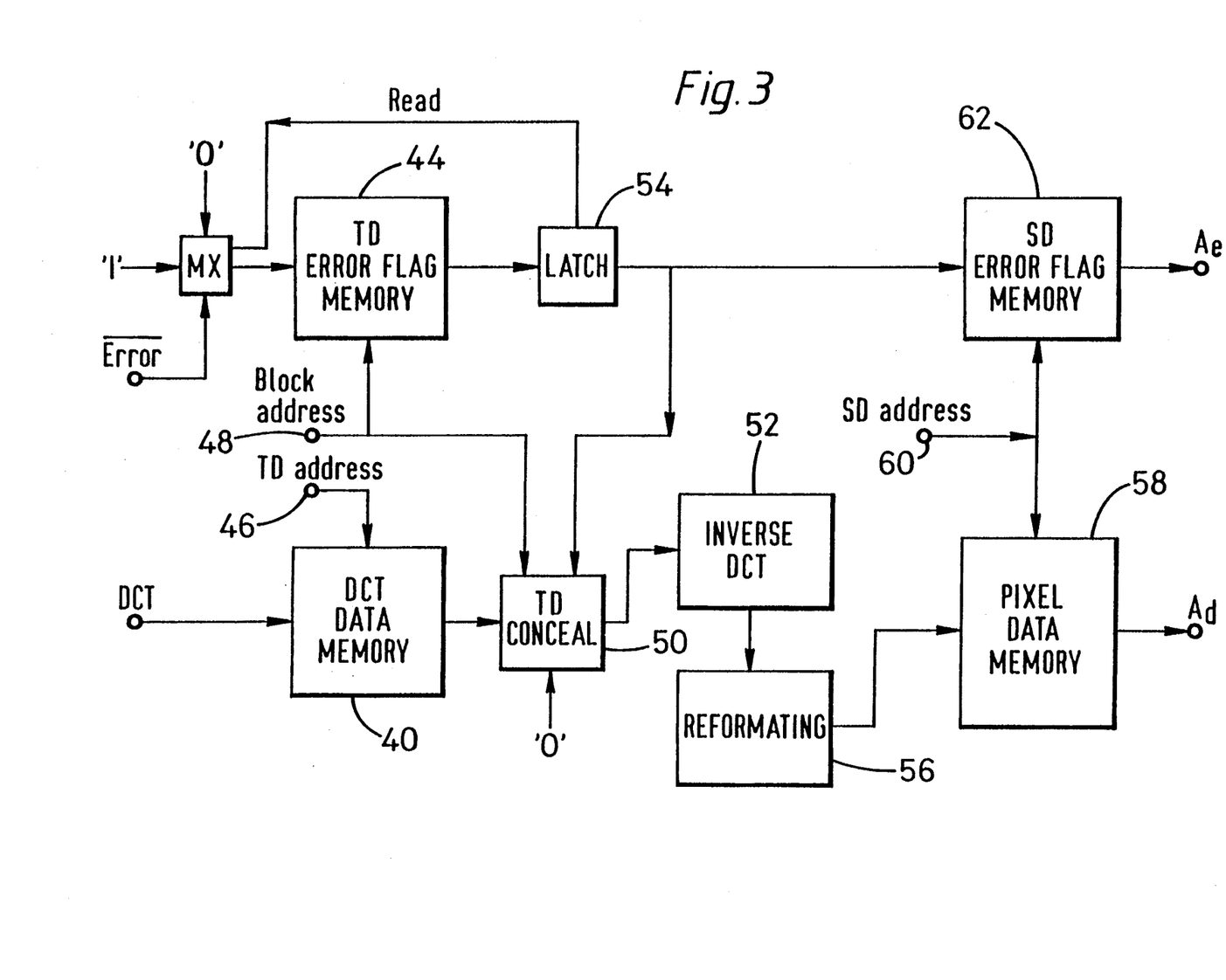
FIG. 3 illustrates in more detail the apparatus for marking errors and transforming image data from the spatial frequency domain to the spatial domain.

FIG. 3 illustrates the circuit elements for transforming the data and error flags from the spatial frequency domain to the spatial domain. For each block of data reproduced from the magnetic tape 16, the stream of entropy decoded DCT coefficients are fed to a DCT data memory 40. At the same time, an error signal derived from the error detector within the channel decoder circuit 22 is fed to a multiplexer 42. If the error signal indicates that the block of data in question is erroneous, then data values of "0" are fed into the spatial frequency domain error flag memory 44. Alternatively, if the error signal indicates the data block in question is correct, then values of "1" are stored in the spatial frequency domain error flag memory 44.

The DCT data memory 40 and the spatial frequency domain error flag memory 44 comprise frame stores. The DCT data memory 40 stores each of the DCT coefficients in a particular memory location under control of a spatial frequency domain address supplied through node 46. The spatial frequency domain error flag memory 44 stores a single bit value for each block of DCT coefficients that are decoded. This error flag is stored at an address controlled by a block address signal supplied through node 48.

When the DCT data and error flag data has been collected, it must then be transformed into the spatial domain. The DCT data is passed via a multiplexer 50 to an IDCT circuit 52 which transforms this data back into the spatial domain. The multiplexer 50 selects either the data stored in the DCT data memory or a substitute zero value in dependence upon whether an error flag is indicated for the particular block being transformed. During the decoding of each block, its error flag is stored in latch 54.

The output from the IDCT unit 52 is reformatted into appropriate pixel positions from the sub picture arrangement illustrated in FIG. 2 by a reformatting circuit 56 and then stored into a pixel data memory 58 under the control of a spatial domain address supplied at node 60. At the same time, the error flag value currently indicated for that block on latch 54 is stored in a spatial domain error flag memory 62. The position in which each spatial domain error flag is stored is controlled by the same spatial domain address supplied at node 60 and so those pixel values dependent upon erroneous data blocks are flagged as such. The contents of the spatial domain error flag memory and the pixel data memory can be read therefrom via channels $A_e$ and $A_d$.

Figure 4:
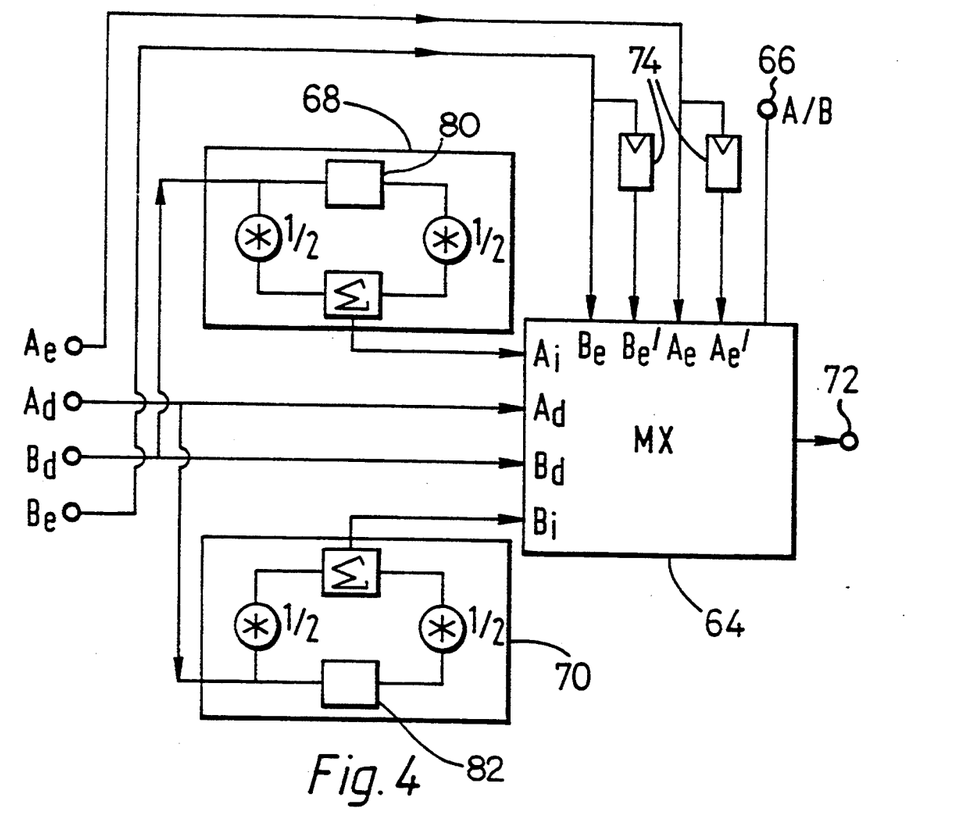
FIG. 4 illustrates apparatus for recombining sub sampled data and performing any necessary error concealment for a two channel system such as that illustrated in FIG. 3.

FIG. 4 illustrates the recombination and error concealment circuits. The spatial domain pixel data and the corresponding error flag data for each of two horizontally sub sampled channels A and B are input to a multiplexer 64. If no errors are present then the multiplexer 64 selects alternating ones of the data values from the channels A and B under control of an A/B signal supplied at node 66.

The pixel data from respective ones of the A and B channels are also fed to filter circuits 68, 70. These filter circuits 68, 70 comprise two-tap finite impulse response filters with one pixel delay 80, 82 between stages (i.e. one pixel for the channel they receive pixels from). The output of each of these filter circuits 68, 70 is the average of the latest two pixel values on the channel to which it is connected. The output based upon the pixel values from channel A can, if necessary, be used to conceal a missing data value on channel B. This interpolated value is shown as $B_i$. The corresponding situation is also true for the other sub sampled channel, the interpolated data value being shown as $A_i$.

When an error is present in a pixel data value being fed to the multiplexer 64, then the multiplexer selects the appropriate interpolated value $A_i$, $B_i$ under control of the error flag signals $A_e$, $B_e$. The output from the multiplexer 64 to node 72 is a recombined and error concealed version of the two horizontally sub sampled streams of data supplied to it.

Figure 5:
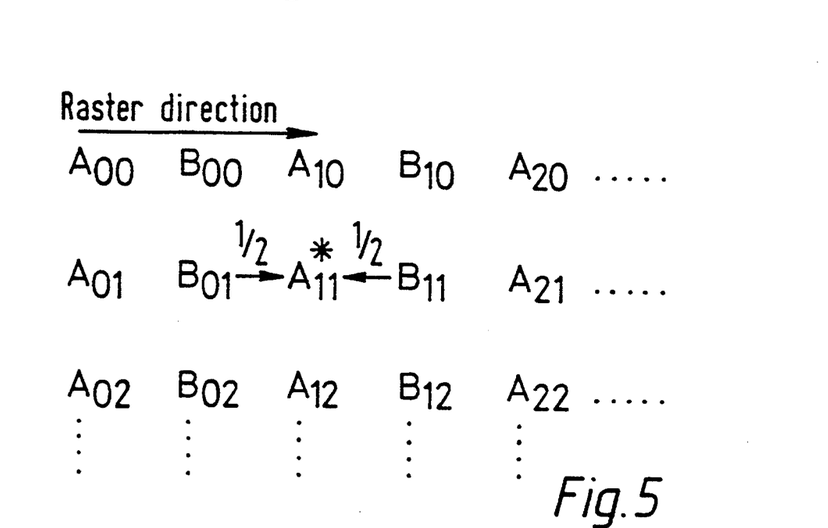
FIG. 5 illustrates horizontal sub sampling and horizontal interpolation.

FIG. 5 illustrates interpolation carried out upon horizontally sub sampled data. Data values from respective channels A and B at particular pixel locations within the overall image data are shown. The error detector within the channel decoder circuit 24 determines from the error correction codes that pixel value $A_{11}$ is in error and sets an error flag "*" for that pixel value. Subsequently, when that pixel value reaches the circuit of FIG. 4, it is replaced with a value interpolated from the horizontally adjacent pixel values $B_{01}$ and $B_{11}$.

Figure 6A:
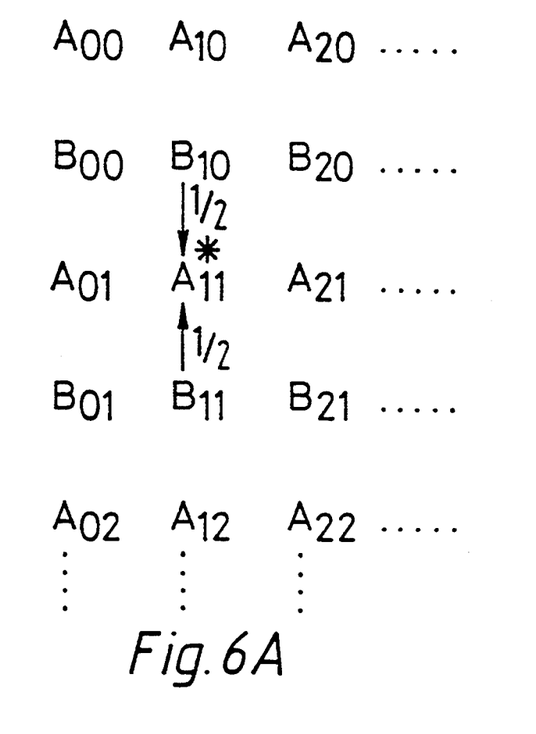
FIGS. 6A and 6B illustrate vertical and quincunx sub sampling and error concealment respectively.

FIG. 6A illustrates a vertically sub sampled image with a erroneous pixel $A_{11}$ being concealed with a pixel value interpolated from vertically adjacent pixels $B_{10}$, $B_{11}$ from the other data channel.

Figure 6B:
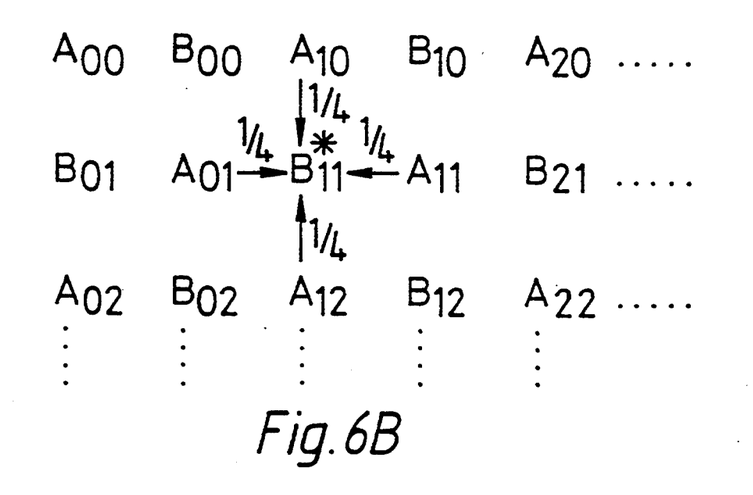

FIG. 6B illustrates a quincunx sub sampled picture. In this case, an erroneous pixel $B_{11}$ is surrounded by four pixel values $A_{01}$, $A_{10}$, $A_{11}$, $A_{12}$ from the other channel and these are used to interpolate a concealment value for that erroneous pixel.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An image data processing apparatus for generating output image data signals representing an image in a spatial domain from a plurality of sets of input image data signals each representing in a spatial frequency domain a sub sampled version of said image in said spatial domain, said image data processing apparatus comprising:
    input means for receiving said plurality of sets of input image data signals;
    an error detector for detecting any erroneous parts of said plurality of sets of input image data signals;
    domain transformation means for transforming each of said plurality of sets of input image data signals from said spatial frequency domain into a sub sampled version of said image in said spatial domain;
    error concealment means for interpolating in said spatial domain any parts of said sub sampled versions that are dependent upon an erroneous part of a set of input image data signals from one or more spatially adjacent parts of one or more other sub sampled versions; and
    combining means for combining said sub sampled versions to form said output image data signals.

2. An image data processing apparatus as claimed in claim 1, wherein said image is a horizontally raster scanned image and said sub sampled versions are horizontally sub sampled.

3. An image data processing apparatus as claimed in claim 2, wherein said image is represented by a first horizontally sub sampled version and a second horizontally sub sampled version, and said error concealment means interpolates any parts of said first horizontally sub sampled version from horizontally adjacent parts of said second horizontally sub sampled version.

4. An image data processing apparatus as claimed in claim 1, wherein said plurality of sets of input image data signals are processed by a plurality of different data processing channels.

5. An image data processing apparatus as claimed in claim 4, wherein said image is a moving image and said plurality of sets of input image data signals switch data processing channels between temporally adjacent images.

6. An image data processing apparatus as claimed in claim 1, wherein each of said plurality of sets of input image data signals is formed by performing discrete cosine transformation upon blocks of image image data signals within said sub sampled version represented by that set of input image data signals.

7. An image data recording and reproducing apparatus including an image data processing apparatus as claimed in claim 1.

8. An image data processing apparatus for generating output image data signals representing an image in a spatial domain from a plurality of sets of input image data signals each representing in a spatial frequency domain a sub sampled version of said image in said spatial domain, comprising:

input means for receiving said plurality of sets of input image data signals;

an error detector for detecting erroneous parts of said plurality of sets of input image data signals;

a spatial frequency domain error flag memory for storing spatial frequency domain error flags indicating those parts of said plurality of sets of input image data signals that are erroneous;

domain transformation means for transforming each of said plurality of sets of input image data signals from said spatial frequency domain into a sub sampled version of said image in said spatial domain;

a spatial domain error flag memory for storing spatial domain error flags indicating those parts of said sub sampled versions that are dependent upon an erroneous part of said plurality of sets of input;

error flag mapping means for mapping said spatial frequency domain error flags to said spatial domain error flags;

error concealment means for interpolating in said spatial domain those parts of said sub sampled versions that are dependent upon an erroneous part of a set of input image data signals from one or more spatially adjacent parts of one or more other sub sampled versions as a function of said spatial domain error flags; and combining means for combining said sub sampled versions to form said output image data signals.

9. An image data processing apparatus as claimed in claim 8, wherein said image is a horizontally raster scanned image and said sub sampled versions are horizontally sub sampled.

10. An image data processing apparatus as claimed in claim 8, wherein said image is represented by a first horizontally sub sampled version and a second horizontally sub sampled version, and said error concealment means interpolates those parts of said first horizontally sub sampled version from horizontally adjacent parts of said second horizontally sub sampled version.

11. An image data processing apparatus as claimed in claim 8, wherein said plurality of sets of input image data signals are processed by a plurality of different data processing channels.

12. An image data processing apparatus as claimed in claim 11, wherein said image is a moving image and said plurality of sets of input image data signals switch data processing channels between temporally adjacent images.

13. An image data processing apparatus as claimed in claim 8, wherein each of said plurality of sets of input image data signals is formed by performing discrete cosine transformation upon blocks of image data signals within said sub sampled version represented by that set of input image data signals.

14. An image data recording and reproducing apparatus including an image data processing apparatus as claimed in claim 8.

* * * * *